US008268425B2

(12) United States Patent
Vogt et al.

(10) Patent No.: US 8,268,425 B2
(45) Date of Patent: *Sep. 18, 2012

(54) POLYETHYLENE MOLDING COMPOSITION FOR EXTERNAL SHEATHING OF ELECTRIC CABLES

(75) Inventors: Heinz Vogt, Frankfurt (DE); Joachim Berthold, Kelkheim (DE)

(73) Assignee: Basell Polyolefine GmbH, Wesseling (DE)

( * ) Notice: Subject to any disclaimer, the term of this patent is extended or adjusted under 35 U.S.C. 154(b) by 908 days.

This patent is subject to a terminal disclaimer.

(21) Appl. No.: 11/667,987

(22) PCT Filed: Nov. 17, 2005

(86) PCT No.: PCT/EP2005/012305
§ 371 (c)(1),
(2), (4) Date: Jun. 14, 2007

(87) PCT Pub. No.: WO2006/053740
PCT Pub. Date: May 26, 2006

(65) Prior Publication Data
US 2008/0274353 A1 Nov. 6, 2008

Related U.S. Application Data

(60) Provisional application No. 60/633,338, filed on Dec. 3, 2004.

(30) Foreign Application Priority Data

Nov. 18, 2004 (DE) .......................... 10 2004 055 587

(51) Int. Cl.
*B29C 47/00* (2006.01)
*C08L 23/00* (2006.01)
*C08F 8/00* (2006.01)

(52) U.S. Cl. ...... 428/36.9; 428/379; 428/35.7; 525/240; 525/242; 525/319; 525/321; 525/322; 525/191; 525/53; 525/65

(58) Field of Classification Search .................. 526/64, 526/65; 525/53, 65, 64, 191, 193, 240, 242, 525/319, 321, 322, 324; 502/111, 113, 103, 502/117; 385/100, 113, 141; 428/378, 379, 428/375, 383, 36.9, 401
See application file for complete search history.

(56) References Cited

U.S. PATENT DOCUMENTS

| | | | | |
|---|---|---|---|---|
| 3,280,220 | A * | 10/1966 | Nelson | 525/240 |
| 4,336,352 | A | 6/1982 | Sakurai et al. | |
| 4,447,587 | A | 5/1984 | Berthold et al. | |
| 4,536,550 | A * | 8/1985 | Moriguchi et al. | 525/240 |
| 4,975,485 | A | 12/1990 | Sato et al. | |
| 5,338,589 | A | 8/1994 | Bohm et al. | |
| 5,350,807 | A | 9/1994 | Pettijohn et al. | |
| 5,422,400 | A | 6/1995 | Kamiyama et al. | |
| 5,648,309 | A | 7/1997 | Böhm | |
| 5,684,097 | A * | 11/1997 | Palmroos et al. | 526/64 |
| 5,718,974 | A * | 2/1998 | Kmiec | 428/383 |
| 5,882,750 | A | 3/1999 | Mink et al. | |
| 6,136,924 | A | 10/2000 | Promel | |
| 6,180,721 | B1 * | 1/2001 | Rogestedt et al. | 525/191 |
| 6,242,548 | B1 | 6/2001 | Duchesne et al. | |
| 6,329,054 | B1 | 12/2001 | Rogestedt et al. | |
| 6,344,522 | B1 | 2/2002 | Promel | |
| 6,407,185 | B1 | 6/2002 | Promel | |
| 6,713,561 | B1 * | 3/2004 | Berthold et al. | 525/191 |
| 2003/0149180 | A1 | 8/2003 | Van Dun et al. | |
| 2006/0052542 | A1 | 3/2006 | Berthold et al. | |
| 2006/0074193 | A1 | 4/2006 | Berthold et al. | |
| 2006/0074194 | A1 | 4/2006 | Berthold et al. | |
| 2006/0155058 | A1 | 7/2006 | Berthold et al. | |

FOREIGN PATENT DOCUMENTS

| | | |
|---|---|---|
| DE | 199 45 980 | 3/2001 |
| DE | 102 59 491 | 7/2004 |
| EP | 0 129 312 | 12/1984 |
| EP | 0 068 257 | 4/1985 |
| EP | 0 401 776 | 12/1990 |
| EP | 0 492 656 | 7/1992 |
| EP | 0 532 551 | 3/1993 |
| EP | 0 603 935 | 6/1994 |
| EP | 0 797 599 | 10/1997 |
| EP | 0 905 151 | 3/1999 |
| EP | 1 266 738 | 3/2003 |
| GB | 2 056 996 | 3/1981 |
| JP | A-58-210947 | 8/1983 |
| WO | 91/18934 | 12/1991 |
| WO | 97/03124 | 1/1997 |

(Continued)

OTHER PUBLICATIONS

M. Fleißner, "Slow Crack Growth and Creep Rupture Strength of Polyethylene Pipe," *Kunststoffe German Plastics*, vol. 77, p. 45-50 (1987).
Flory, P.J. et al., "Crystalline Olefin Polymers Part II," High Polymers, John Wiley & Sons Inc., New York, vol. XX, (1964).
"Auxiliaries for Crop Protection Formulations," Clariant Brochure, Product Range Crop Protection, Edition 2008.

(Continued)

*Primary Examiner* — Elizabeth Cole
*Assistant Examiner* — Altrev Sykes
(74) *Attorney, Agent, or Firm* — Dilworth IP LLC

(57) ABSTRACT

The invention relates to a polyethylene molding composition which has a multimodal molar mass distribution and is particularly suitable for producing external sheathing of electric or information transmission cables. The molding composition has a density at a temperature of 23° C. in the range from 0.94 to 0.95 g/cm$^3$ and an $MFI_{190/5}$ in the range from 1.2 to 2.1 dg/min. It comprises from 45 to 55% by weight of a low molecular weight ethylene homopolymer A, from 30 to 40% by weight of a high molecular weight copolymer B of ethylene and another olefin having from 4 to 8 carbon atoms and from 10 to 20% by weight of an ultra high molecular weight ethylene copolymer C. The invention also relates to an electric or information transmission cable having an external sheath of the polyethylene molding composition which has a thickness in the range from 0.2 to 3 cm.

9 Claims, No Drawings

FOREIGN PATENT DOCUMENTS

| | | |
|---|---|---|
| WO | 97/03139 | 1/1997 |
| WO | 01/23446 | 4/2001 |
| WO | WO 01/23446 | 4/2001 |
| WO | 2004/056921 | 7/2004 |
| WO | 2004/058876 | 7/2004 |
| WO | 2004/058877 | 7/2004 |
| WO | 2004/085578 | 7/2004 |
| WO | 2006/053740 | 5/2006 |
| WO | 2006/053741 | 5/2006 |

* cited by examiner

POLYETHYLENE MOLDING COMPOSITION FOR EXTERNAL SHEATHING OF ELECTRIC CABLES

This application is the U.S. national phase of International Application PCT/EP2005/012305, filed Nov. 17, 2005, claiming priority to German Patent Application 102004055587.7 filed Nov. 18, 2004, and the benefit under 35 U.S.C. 119(e) of U.S. Provisional Application No. 60/633,338, filed Dec. 3, 2004; the disclosures of International Application PCT/EP2005/012305, German Patent Application 102004055587.7 and U.S. Provisional Application No. 60/633,338, each as filed, are incorporated herein by reference.

The present invention relates to a polyethylene (PE) molding composition which has a multimodal molar mass distribution and is particularly suitable for producing cable sheathing, and a process for preparing this molding composition in the presence of a catalytic system comprising a Ziegler catalyst and a cocatalyst via a multistage reaction sequence comprising successive polymerization steps.

Polyethylene is widely used for industrial applications in which a material having a high mechanical strength and a high resistance to thermooxidative degradation is required in order to ensure a long life even at elevated use temperatures. In addition, polyethylene has the particular advantages that it has good chemical resistance, it has a low intrinsic weight and it is a material which can easily be processed in the melt.

PE-molding compositions for cable sheathing should accordingly possess the following important properties:
  Easy processability.
  Good resistance to weathering influences.
  Good thermal aging resistance.
  Ability to withstand high mechanical stresses and good abrasion resistance.
  Low permeability to water vapor and oxygen so as to avoid corrosion of the metallic conductor or conductors.

WO 97/03124 describes a coating composition based on polyethylene which has a bimodal molar mass distribution. This coating composition is very suitable for producing external sheathing for energy and information transmission cables, which give the cables sheathed therewith improved durability in respect of corrosion, in respect of oxidative aging, in respect of weathering influences of all types and in respect of mechanical stresses.

Known polyethylene molding compositions having a unimodal molar mass distribution have disadvantages in terms of their processability, their environmental stress cracking resistance and their mechanical toughness. Compared to these, molding compositions having a bimodal molar mass distribution represent a technical improvement. They are easier to process and at the same density have an improved environmental stress cracking resistance and a higher mechanical strength.

It was thus an object of the present invention to develop a polyethylene molding composition which retains good processability but when used as cable sheathing displays significant advantages in respect of environmental stress cracking resistance, resistance to mechanical stresses and improved abrasion behavior for simpler laying and relatively low water vapor permeation and oxygen permeation.

This object is achieved by a molding composition of the generic type mentioned at the outset whose distinguishing features are that it comprises from 45 to 55% by weight of a low molecular weight ethylene homopolymer A, from 30 to 40% by weight of a high molecular weight copolymer B of ethylene and another olefin having from 4 to 8 carbon atoms and from 10 to 20% by weight of an ultra high molecular weight ethylene copolymer C, where all percentages are based on the total weight of the molding composition.

The invention further provides a process for preparing this molding composition in a cascaded suspension polymerization and a defect-free external sheathing of energy and information transmission cables comprising this molding composition and having excellent mechanical strength properties combined with high stiffness.

The polyethylene molding composition of the invention has a density at a temperature of 23° C. in the range from 0.94 to 0.950 g/cm$^3$ and a trimodal molar mass distribution. The high molecular weight copolymer B contains a proportion of further olefin monomer units having from 4 to 8 carbon atoms, namely from 1 to 8% by weight. Examples of such comonomers are 1-butene, 1-pentene, 1-hexene, 1-octene and 4-methyl-1-pentene. The ultra high molecular weight ethylene copolymer C likewise contains one or more of the above-mentioned comonomers in an amount in the range from 1 to 8% by weight.

Furthermore, the molding composition of the invention has a melt flow index in accordance with ISO 1133, expressed as $MFI_{190/5}$, in the range from 0.5 to 2.1 dg/min and a viscosity number $VN_{overall}$, measured in accordance with ISO/R 1191 in decalin at a temperature of 135° C., in the range from 260 to 340 cm$^3$/g, in particular from 280 to 320 cm$^3$/g.

The trimodality as a measure of the position of the centers of gravity of the three individual molar mass distributions can be described with the aid of the viscosity numbers VN in accordance with ISO/R 1191 of the polymers formed in the successive polymerization stages. Here, the band widths of the polymers formed in the individual reaction stages are as follows:

The viscosity number $VN_1$ measured on the polymer after the first polymerization stage is identical to the viscosity number $VN_A$ of the low molecular weight polyethylene A and is, according to the invention, in the range from 50 to 90 cm$^3$/g, in particular in the range from 60 to 80 cm$^{/3}$/g.

The viscosity number $VN_2$ measured on the polymer after the second polymerization stage does not correspond to $VN_B$ of the relatively high molecular weight polyethylene B formed in the second polymerization stage, but is instead the viscosity number of the mixture of polymer A plus polymer B. According to the invention, $VN_2$ is in the range from 260 to 320 cm$^3$/g.

The viscosity number $VN_3$ measured on the polymer after the third polymerization stage does not correspond to $VN_C$ of the ultra high molecular weight copolymer C formed in the third polymerization stage, which can likewise be determined only mathematically, but is instead the viscosity number of the mixture of the polymer A, polymer B plus polymer C. According to the invention, $VN_3$ is in the range from 260 to 340 cm$^3$/g, in particular from 280 to 320 cm$^3$/g.

The polyethylene is obtained by polymerization of the monomers in suspension at temperatures in the range from 70 to 90° C., preferably from 75 to 900° C., a pressure in the range from 2 to 10 bar and in the presence of a highly active Ziegler catalyst composed of a transition metal compound and an organoaluminum compound. The polymerization is a three-stage polymerization, i.e. it is carried out in three successive stages, with the molar mass being regulated in each stage by means of added hydrogen.

Apart from the polyethylene, the polyethylene molding composition of the invention can further comprise additional additives. Such additives are, for example, heat stabilizers, antioxidants, UV absorbers, light stabilizers, metal deactivators, peroxide-decomposing compounds, basic costabilizers, in amounts of from 0 to 10% by weight, preferably from 0 to 5% by weight, and also carbon black, fillers, pigments, flame retardants, or combinations of these in total amounts of from 0 to 50% by weight, based on the total weight of the mixture.

The molding composition of the invention is particularly useful for producing external sheathing of electric cables of all types, e.g. cables for the transmission of information or energy. Such cables usually comprise one or more metallic or nonmetallic conductors which can each be coated with an insulating layer. The cable sheath has the task of protecting the cable against damage by external influences, e.g. during laying, and is preferably applied by extrusion by firstly plasticizing the polyethylene molding composition in an extruder at temperatures in the range from 200 to 250° C. and then extruding it through a suitable nozzle onto the cable surface and cooling it there.

The molding composition of the invention can be processed particularly well by the extrusion process to produce coatings and has a notched impact toughness (ISO) in the range from 8 to 14 kJ/m$^2$ and an environmental stress cracking resistance (ESCR) in the range >200 h.

The notched impact toughness$_{ISO}$ is measured at −30° C. in accordance with ISO 179-1/1eA/DIN 53453. The dimensions of the specimen are 10×4×80 mm, and it is provided with a V-notch having an angle of 45°, a depth of 2 mm and a radius at the bottom of the notch of 0.25 mm.

The environmental stress cracking resistance (ESCR) of the molding composition of the invention is determined by an internal measurement method and is reported in h. This laboratory method is described by M. Fleißner in Kunststoffe 77 (1987), p. 45 ff, and corresponds to ISO/CD 16770 which is now valid. The publication shows that there is a relationship between the determination of slow crack growth in a creep test on test rods having a circumferential notch and the brittle branch of the internal pressure test in accordance with ISO 1167. A shortening of the time to failure is achieved by shortening the crack initiation time by means of the notch (1.6 mm/razor blade) in ethylene glycol as medium inducing environmental stress cracking at a temperature of 80° C. and a tensile stress of 3.5 MPa. The production of the specimens is carried out by sawing three test specimens having dimensions of 10×10×90 mm from a 10 mm thick pressed plate. The test specimens are in turn notched in the middle by means of a razor blade in a notching apparatus made in-house for this purpose (cf. FIG. 5 in the publication). The notch depth is 1.6 mm.

EXAMPLE 1

The polymerization of ethylene was carried out in a continuous process in three reactors connected in series. A Ziegler catalyst which had been prepared by the method of WO 91/18934, example 2, and has the operations number 2.2 in the WO in an amount of 0.08 mmol/h and also sufficient suspension medium (hexane), triethylaluminum as cocatalyst in an amount of 0.08 mmol/h, ethylene and hydrogen were fed into the first reactor. The amount of ethylene (=65 kg/h) and the amount of hydrogen (=68 g/h) were set so that a proportion of from 25 to 26% by volume ethylene and a proportion of 65% by volume of hydrogen were measured in the gas space of the first reactor; the remainder was a mixture of nitrogen and vaporized suspension medium.

The polymerization in the first reactor was carried out at a temperature of 84° C.

The suspension from the first reactor was then passed to a second reactor in which the proportion of hydrogen in the gas space had been reduced to 7-9% by volume and into which an amount of 48.1 kg/h of ethylene plus an amount of 2940 g/h of 1-butene were introduced. The reduction in the amount of hydrogen was achieved by means of H$_2$ intermediate depressurization. 73% by volume of ethylene, 8% by volume of hydrogen and 0.82% by volume of 1-butene were measured in the gas space of the second reactor; the remainder was a mixture of nitrogen and vaporized suspension medium.

The polymerization in the second reactor was carried out at a temperature of 80° C.

The suspension from the second reactor was passed via a further H$_2$ intermediate depressurization, by means of which the amount of hydrogen in the gas space in the third reactor was set to 2.5% by volume, into the third reactor.

An amount of 16.9 kg/h of ethylene plus an amount of 1500 g/h of 1-butene were introduced into the third reactor. A proportion of ethylene of 87% by volume, a proportion of hydrogen of 2.5% by volume and a proportion of 1-butene of 1.2% by volume were measured in the gas space of the third reactor; the remainder was a mixture of nitrogen and vaporized suspension medium.

The polymerization in the third reactor was carried out at a temperature of 80° C.

The long-term activity of the polymerization catalyst necessary for the above-described cascaded mode of operation was ensured by a specially developed Ziegler catalyst having the composition reported in the abovementioned WO document. A measure of the usability of this catalyst is its extremely high response to hydrogen and its high activity which remains constant over a long period of from 1 to 8 hours.

The suspension medium is separated off from the polymer suspension leaving the third reactor, the powder is dried and the powder is passed to pelletization.

The viscosity numbers and the proportions W$_A$, W$_B$ and W$_C$ of polymers A, B and C for the PE molding composition prepared as described in example 1 are shown in table 1 below:

TABLE 1

| Example | 1 |
|---|---|
| W$_A$ [% by weight] | 50 |
| W$_B$ [% by weight] | 37 |
| W$_C$ [% by weight] | 13 |
| VN$_1$ [cm$^3$/g] | 80 |
| VN$_2$ [cm$^3$/g] | 280 |
| VN$_{overall}$ [cm$^3$/g] | 304 |
| FNCT [h] | 220 |
| AFM (−30° C.) | 3.8 kJ/m$^2$ |
| ACN (+23° C.) | 13 kJ/m$^2$ |

The abbreviations for the physical properties in table 1 have the following meaning:

FNCT=environmental stress cracking resistance (Full Notch Creep Test) measured by the internal measurement method described by M. Fleißner in [h], conditions: 95° C., 3.5 MPa, water/2% of Arkopal.

AFM (−30° C.)=notched impact toughness, measured in accordance with ISO 179-1/1eA/DIN 53453 in [kJ/m$^2$] at −30° C.

ACN (+23° C.)=notched impact toughness, measured in accordance with ISO 179-1/1eA/DIN 53453 in [kJ/m$^2$] at +23° C.

An energy cable having a diameter of 5 cm was sheathed externally with the polyethylene molding composition prepared in this way by plasticizing the molding composition at a temperature of 220° C. in an extruder and then extruding it through an annular nozzle onto the electric cable and cooling it there. The sheath produced in this way had a thickness of 0.5 cm.

The resulting surface on the electric cable was smooth and displayed no visible damage.

The electric cable produced in this way was, for test purposes, packed in a steel mesh basket and stored in the River Main in Frankfurt at a depth of 2 m below the water surface. The duration of the storage was 1 year, and the water temperature varied, depending on the time of year, from +3 to +27° C.

After a storage time of one year, the cable was taken out again and examined visually. After mechanical removal of adhering mud and algae, the appearance of the external sheathing of the cable was no different from the state immediately after it had been produced.

The invention claimed is:

1. A polyethylene molding composition for cable sheathing comprising a multimodal molar mass distribution; a density at a temperature of 23° C. in the range from 0.94 to 0.950 g/cm$^3$; an MFI$_{190/5}$ in the range from 0.5 to 2.1 dg/min; from 45 to 55% by weight of a low molecular weight ethylene homopolymer A; from 30 to 40% by weight of a high molecular weight copolymer B of ethylene and another olefin having from 4 to 8 carbon atoms; and from 10 to 20% by weight of an ultra high molecular weight ethylene copolymer C, where all percentages are based on the total weight of the molding composition,
wherein the molding composition has a VN$_3$ of 280 to 320 cm$^3$/g, a notched impact toughness AFM (−30° C.) in the range from 3.5 to 4.5 kJ/m$^2$, a notched impact toughness ACN (+23° C.) in the range from 12 to 16 kJ/m$^2$, and an environmental stress cracking resistance (FNCT) in the range from 150 to 250 h, and each of the low molecular weight ethylene homopolymer A, high molecular weight copolymer B and ultra high molecular weight ethylene copolymer C are produced in a three-stage polymerization in the presence of a Ziegler catalyst composed of a transition metal compound and an organoaluminum compound, wherein a molar mass of the polyethylene formed in each stage is regulated in each case by means of hydrogen.

2. The polyethylene molding composition according to claim 1, wherein the high molecular weight copolymer B contains from 1 to 8% by weight, based on the weight of copolymer B, of comonomers having from 4 to 8 carbon atoms and the ultra high molecular weight ethylene copolymer C contains from 1 to 8% by weight, based on the weight of copolymer C, of comonomers.

3. The polyethylene molding composition according to claim 2 wherein the comonomers are selected from 1-butene, 1-pentene, 1-hexene, 1-octene, 4-methyl-1-pentene or mixtures thereof.

4. A process for preparing a polyethylene molding composition for cable sheathing comprising:
a multimodal molar mass distribution;
a notched impact toughness AFM (−30° C.) in the range from 3.5 to 4.5 kJ/m$^2$;
a notched impact toughness ACN (+23° C.) in the range from 12 to 16 kJ/m$^2$;
an environmental stress cracking resistance (FNCT) in the range from 150 to 250 h;
a density at a temperature of 23° C. in the range from 0.94 to 0.950 g/cm$^3$;
an MFI$_{190/5}$ in the range from 0.5 to 2.1 dg/min;
a VN$_3$ of 280 to 320 cm$^3$/g;
from 45 to 55% by weight of a low molecular weight ethylene homopolymer A;
from 30 to 40% by weight of a high molecular weight copolymer B of ethylene and another olefin having from 4 to 8 carbon atoms; and
from 10 to 20% by weight of an ultra high molecular weight ethylene copolymer C, where all percentages are based on the total weight of the molding composition, the process comprising polymerizing in a three-stage polymerization monomer in suspension at temperatures in the range from 70 to 90° C., a pressure in the range from 2 to 10 bar and in the presence of a Ziegler catalyst composed of a transition metal compound and an organoaluminum compound, wherein a molar mass of the polyethylene formed in each stage is regulated in each case by means of hydrogen.

5. The process according to claim 4, further comprising setting a first hydrogen concentration in a first polymerization stage so that a viscosity number VN$_1$ of the low molecular weight polyethylene A is in the range from 50 to 90 cm$^3$/g.

6. The process according to claim 5, further comprising setting a second hydrogen concentration in a second polymerization stage so that a viscosity number VN$_2$ of a mixture of polymer A plus polymer B is in the range from 260 to 320 cm$^3$/g.

7. The process according to claim 6, further comprising setting a third hydrogen concentration in a third polymerization stage so that the viscosity number VN$_3$ of a mixture of polymer A, polymer B plus polymer C is in the range from 280 to 320 cm$^3$/g.

8. A process for the external sheathing of electric cables comprising plasticizing the polyethylene molding composition of claim 1 in an extruder at temperatures in the range from 200 to 250° C., thereby forming a plasticized material; extruding the plasticized material through a nozzle onto the surface of the cable, thereby forming an extruded plasticized material; and cooling the extruded plasticized material.

9. An electric or information transmission cable comprising an internal, electrically conductive core of metal, and an external, electrically nonconductive sheath comprising the polyethylene molding composition of claim 1 wherein the external sheath has a thickness in the range from 0.2 to 3 cm.

* * * * *